United States Patent [19]
Zaidi

[11] Patent Number: 6,032,250
[45] Date of Patent: Feb. 29, 2000

[54] METHOD AND APPARATUS FOR IDENTIFYING INSTRUCTION BOUNDARIES

[75] Inventor: Nazar Zaidi, San Jose, Calif.

[73] Assignee: Intel Corporation, Santa Clara, Calif.

[21] Appl. No.: 08/986,008

[22] Filed: Dec. 5, 1997

[51] Int. Cl.[7] .................................................. G06F 9/38
[52] U.S. Cl. ............................................................ 712/210
[58] Field of Search ..................................... 395/326, 380; 712/210, 204, 300; 708/212

[56] References Cited

U.S. PATENT DOCUMENTS 5,870,599  2/1999  Hinton et al. ............................ 395/586

*Primary Examiner*—John A. Follansbee
*Attorney, Agent, or Firm*—Blakely, Sokoloff, Taylor & Zafman LLP

[57] ABSTRACT

A method and device for identifying boundaries between variable length instructions in a packet of instruction bytes includes examining each instruction byte in a first portion of the packet, marking each instruction byte in the first portion as one of an end byte and a non-end byte in response to the examining act, and marking each instruction byte in a second portion of the packet as a predetermined one of an end byte and a non-end byte.

24 Claims, 5 Drawing Sheets

METHOD AND APPARATUS FOR IDENTIFYING INSTRUCTION BOUNDARIES

BACKGROUND OF THE INVENTION

1. Field of the Invention

The invention relates to decoding instructions, and more specifically, to identifying boundaries between variable length instructions.

2. Description of Related Art

Computers process information by executing a sequence of instructions, which may be supplied from a computer program written in a particular format and sequence designed to direct the computer to perform a particular sequence of operations. Most computer programs are written in high level languages such as FORTRAN or "C," which are not directly executable by the computer processor. These high level instructions are translated into macroinstructions, having a format that can be decoded and executed within the processor.

Macroinstructions may be stored in data blocks having a predefined length in a computer memory element, such as main memory or an instruction cache. Macroinstructions are fetched from the memory elements and then supplied sequentially to one or more decoders, in which each macroinstruction is decoded into one or more micro-operations having a form that is executable by an execution unit in the processor.

Macroinstructions, such as instructions in the Intel iA32 instruction set, may have variable lengths. The Intel iA32 instruction set is described in detail in the Intel Architecture Software Developer's Manual, 1997, available from Intel Corporation, the entire contents of which are incorporated by reference herein. For example, one instruction may be two bytes long, the next four bytes long, the next three bytes, etc. Pipelined processors define multiple stages for processing a macroinstruction. To decode the macroinstructions, the length of the instruction must be calculated; however the length is only available during the decoding operation, not before. The start of the following instruction is then determined based on the length information. Thus, a considerable amount of processing is required to determine the start of the next instruction.

All of this processing may not be accommodated in a single processing (pipeline) stage of high frequency computers. To make the process of marking instruction boundaries amenable for pipelining, end byte markers that indicate the end of a given instruction are calculated as packets of instruction bytes flow through the pipeline. This marking is done even before the actual instruction decoding takes place. Hence, steering to the next instruction becomes a function of end byte markers, rather than depending on decoding the instruction.

A prior art process for decoding macroinstructions is illustrated in FIG. 1. In block 10, a block of instructions is fetched from the memory element. Instruction boundaries, which are defined as the location between adjoining macroinstructions in the instruction code, are marked in block 12. For example, an end byte marker may be set to a logically high state if its associated byte is the last byte of an instruction, or the end byte, and set to a logically low state if the associated byte is not an end byte. After the instruction boundaries are marked, they are rotated, or aligned, in block 14 based on the end byte markers so that each decoder may receive an instruction starting with the beginning of the instruction. The macroinstructions are then decoded into micro-ops, also referred to as uops, in block 16.

In known instruction decoding systems, the instruction length decode logic identifies and marks end bytes for an instruction packet having a predetermined number of instruction bytes. Providing end byte markers to mark instruction boundaries is well known in the art, and has been implemented in several computer systems. As an example, FIG. 2 illustrates two stages of an instruction decode pipeline for a prior art processor, such as the Intel® Pentium® Pro processor. The Pentium Pro system marks end bytes for an instruction packet containing eight instruction bytes during each clock cycle. In the instruction boundary marking stage 20, end bytes 22 for the eight instruction bytes b0–b7 are marked during a first clock cycle, then passed on to the align stage 24 for rotation during the next clock cycle. Instruction bytes b2 and b6 are marked as end bytes in FIG. 2. Thus, one instruction ends with byte b2 and the following instruction begins with byte b3, and another instruction ends with byte b6 with the following instruction beginning with byte b7.

As processor frequency increases, however, each of the predetermined number of bytes cannot be marked and passed to the next stage during a single clock cycle. Changing the instruction packet size flowing through the processor pipeline most likely would require substantial system redesign, thereby degrading system performance. Thus a need exists for a method and device for marking instruction boundaries in high frequency machines, without degrading performance.

SUMMARY OF THE INVENTION

In a first aspect of the invention, a method for identifying boundaries between variable length instructions in a packet of instruction bytes is presented. The method includes examining each instruction byte in a first portion of the packet, marking each instruction byte in the first portion as an end byte or a non-end byte in response to the examining act, and marking each instruction byte in a second portion of the packet as a predetermined one of an end byte or a non-end byte.

In another aspect of the invention a device for identifying boundaries between variable length instructions in a packet of instruction bytes includes a first stage adapted to receive the packet of instruction bytes and examine the instruction bytes in a first portion of the packet. At least one end byte marker is provided by the first stage in response to examining the instruction bytes in the first portion, with each end byte marker corresponding to an instruction byte and having one of a first level that represents an end byte and a second level that represents a non-end byte. At least one end byte predictor is provided by the first stage. Each end byte predictor corresponds to an instruction byte in a second portion of the packet and is set to a preselected one of the first level and the second level. A second stage is coupled to the first stage to receive the end byte markers and the end byte predictors.

Yet another aspect of the invention provides a method of providing instruction end byte markers that identify boundaries between variable length instructions in a packet of instruction bytes from a first processing stage to a second processing stage. The method includes providing end byte markers for a first portion of a first packet and at least one end byte predictor for a second portion of the first packet to the second processing stage during a first clock cycle after a reset. End byte markers for the second portion of the first packet, end byte markers for a first portion of a second packet, and at least one end byte predictor for a second portion of the second packet are provided to the second processing stage during a second clock cycle after the reset.

BRIEF DESCRIPTION OF THE DRAWINGS

Other objects and advantages of the invention will become apparent upon reading the following detailed description and upon reference to the drawings in which.

Figure 1:
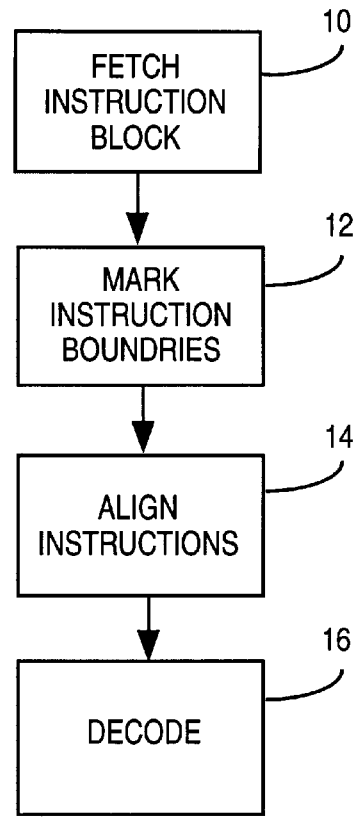
FIG. 1 is a flow diagram illustrating a prior art process for decoding variable macroinstructions.
Figure 2:
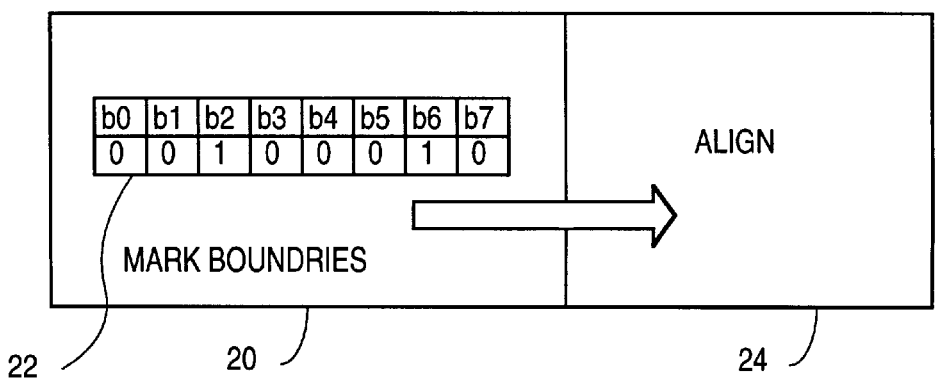
FIG. 2 illustrates two instruction decode pipeline stages for a prior art processor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As discussed in the Background of the Invention section herein, as processor frequency increases, all instruction boundaries for all bytes in an instruction packet may not be marked and passed to the next stage during a desired time period, such as a single clock cycle. An embodiment of the present invention provides a method and device that marks the instruction bytes in a first portion of an instruction packet as end bytes or non-end bytes, then predicts whether the remaining bytes in a second portion of the instruction packet are end bytes or non-end bytes by marking the remaining end bytes in a predetermined manner. The predicted end-byte markers may be corrected during a subsequent clock cycle.

Figure 3:
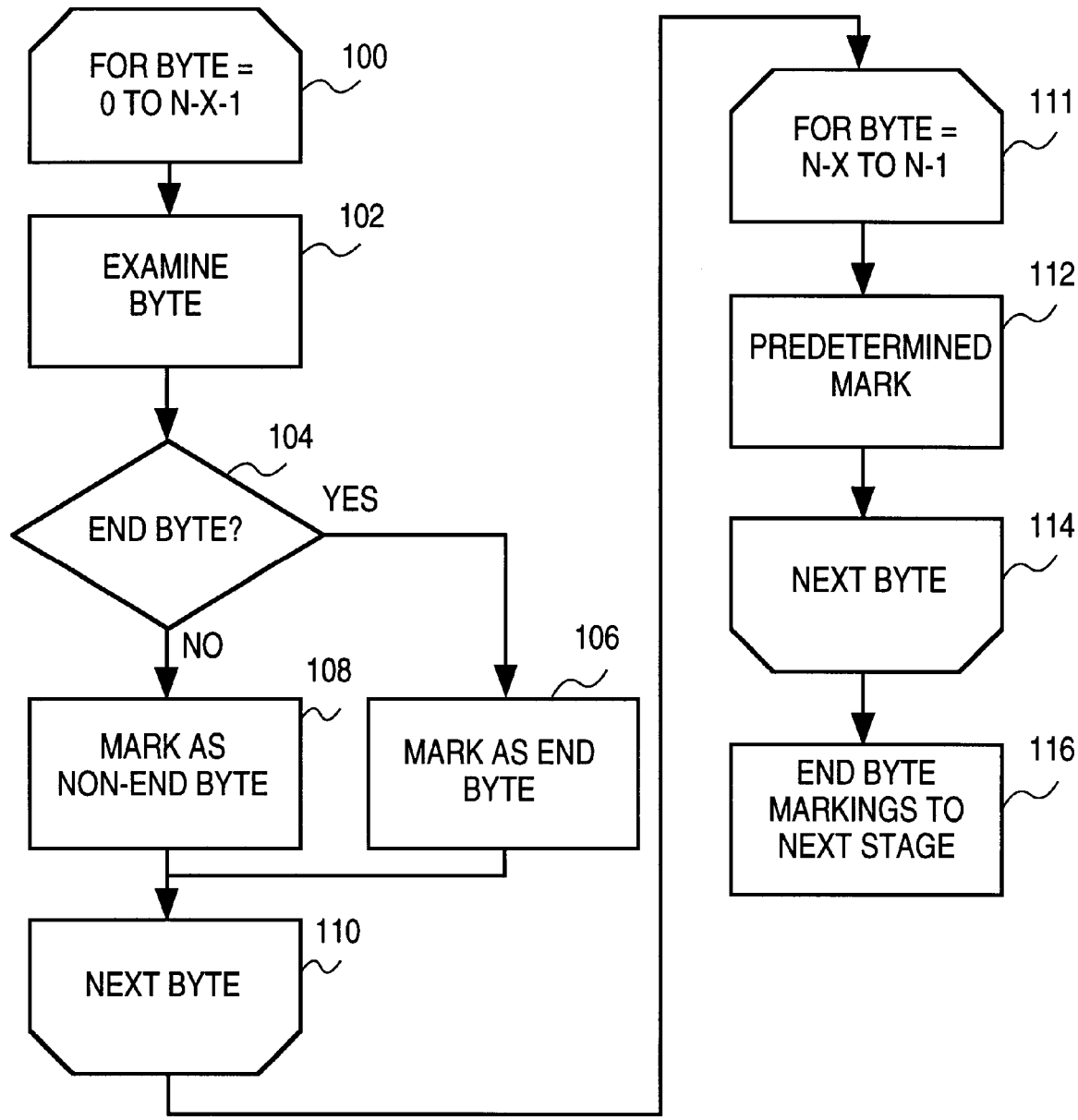
FIG. 3 is a flow diagram illustrating an embodiment of a method in accordance with the present invention.

FIG. 3 is a flow diagram illustrating an embodiment of a method in accordance with the present invention. In known instruction length decoder circuits, instruction boundaries for an instruction packet containing a predetermined number of bytes may be marked. The total number of bytes in the packet may be referred to as n. Since the lowest order byte is byte 0, the highest order byte is n−1. In one particular exemplary embodiment, the instruction packet includes eight bytes that are examined and marked as end bytes or non-end bytes. Thus, for this particular exemplary embodiment, n=8, the lowest order byte is 0, and the highest order byte is 7 (n−1).

In an embodiment in accordance with the present invention, the instruction packet is divided into first and second portions. The second portion has a predetermined number of bytes, which may be referred to as x. The first portion comprises bytes 0 through n−x−1, and therefore, the second portion has x bytes, bytes n−x through n−1. In the exemplary embodiment described above having an instruction packet that includes eight bytes, bytes 0–7, the second portion includes one byte. Thus, n=8 and x=1. Therefore, the first portion of the instruction packet comprises bytes 0 through 6 (n−x−1) and the second portion comprises byte 7 (n−1). While the particular embodiment described has an eight-byte instruction packet, with n=8 and x=1, the instruction packets and first and second portions thereof are not limited to any particular number of instruction bytes. The values of n and x may be any predetermined positive integers.

Block 100 of FIG. 3 defines the beginning of a first loop that includes the first portion of the instruction packet. Each byte in the first portion of the instruction packet is examined in block 102, and identified as an end byte (the last byte in a macroinstruction) or a non-end byte in decision block 104. If the examined byte is an end byte, it is so marked in block 106, and similarly, if the examined byte is not an end byte, it is marked as a non-end byte in block 108. The process loops in block 110, with the next byte of the first portion being examined. In a particular embodiment, the end byte markers comprise an end byte bit, which is set to a first logic level (for example, logic 0) if the instruction byte is a non-end byte marker, and if the examined end byte is an end byte, the end byte bit is set to a second logic level (for example, logic 1) to mark the end byte. Any appropriate end byte marking mechanism may be used.

When each instruction byte in the first portion of the instruction packet has been examined and marked as an end byte or non-end byte, the bytes for the second portion of instruction packet are considered. As discussed in the Background of the Invention section, known instruction length decoding logic does not have sufficient time to mark all of the bytes in the instruction packet and pass the end byte information to the next pipeline stage in high frequency systems. Thus, in the embodiment illustrated in FIG. 3, each instruction byte in the second portion of the instruction packet is set in a predetermined manner. In other words, the end byte markers for the bytes in the second portion of the instruction packet are predicted as being an end byte marker or a non-end marker.

Block 111 begins a loop to mark the instruction bytes in the second portion of the instruction packet, which is defined as bytes n−x. The instruction bytes are marked in the predetermined manner in block 112, and the loop closes in block 114. The end byte markers for the entire instruction packet are then passed on to the subsequent pipeline stage in block 116.

Figure 4:
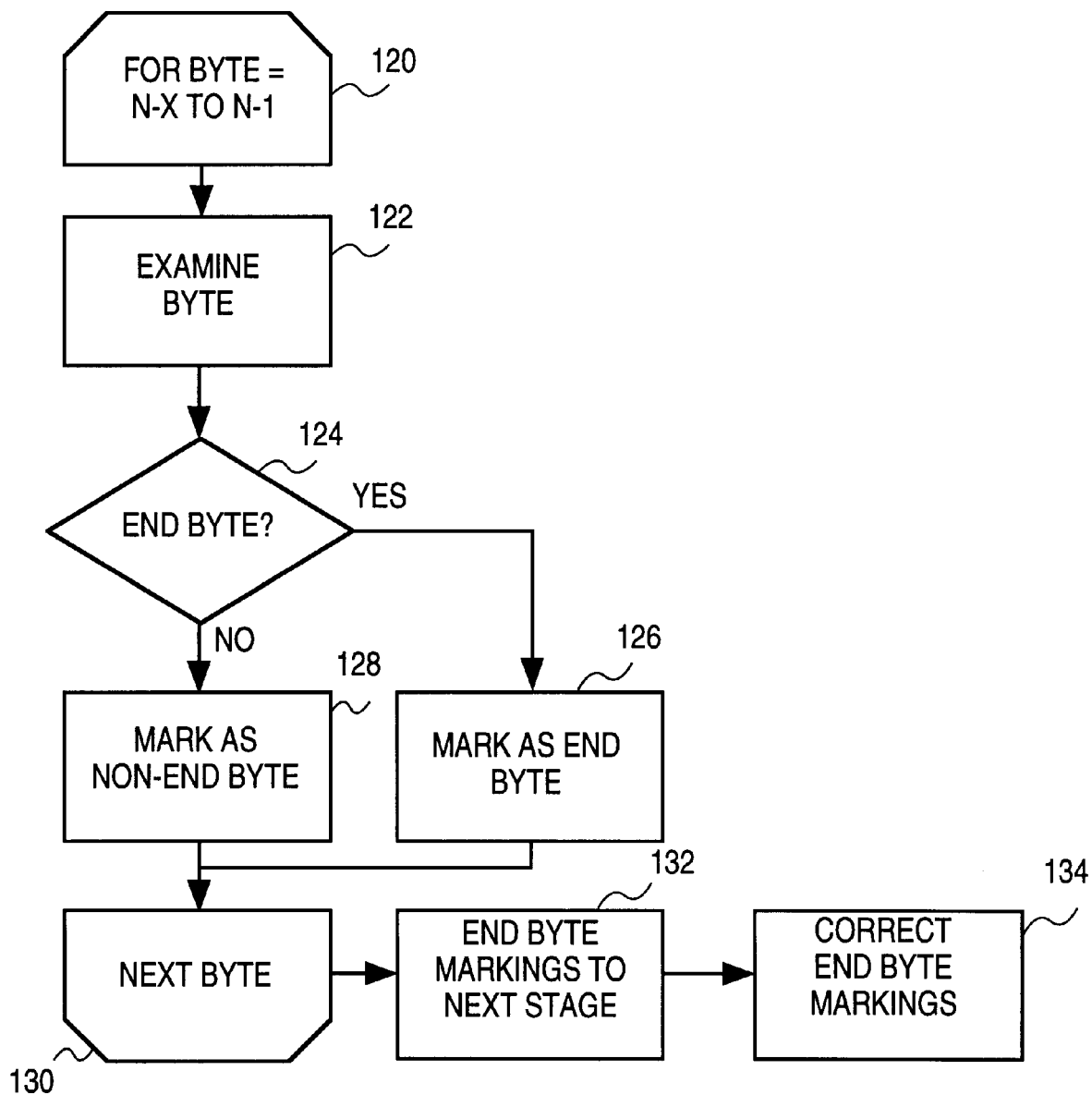
FIG. 4 is a flow diagram illustrating another embodiment of a method in accordance with the present invention.

FIG. 4 illustrates a further embodiment of a method in accordance with the present invention. Block 120 begins a loop in which the instruction bytes of the second portion of the instruction packet are marked as end bytes or non-end bytes. The second portion of the instruction packet includes x bytes that comprise bytes n−x through n−1. In block 122, the instruction bytes are examined to determine whether they are end bytes that will be used to identify the boundary between instructions. Based on the results of a decision block 124, the instruction bytes are marked as an end byte in block 126 or a non-end byte in block 128. Block 130 defines the end of the loop.

In block 132, the end byte markings for the second portion of the instruction packet are passed along to the next pipeline stage. The predetermined end byte marking that was set in block 112 of FIG. 3 may then be corrected, as necessary, in block 134 based on the examination of the bytes in block 122 of FIG. 4 and the subsequent end byte marking of block 126 or block 128, as appropriate. For example, it may be predetermined to mark all instruction bytes in the second portion as non-end bytes in block 112 or FIG. 3. If an instruction byte in the second portion is marked as an end byte in block 126 of FIG. 4, based upon the examination of the instruction byte in block 122, the predetermined, or predicted, marking as a non-end byte from block 112 is corrected to the proper marking as an end byte in block 132. In one embodiment in accordance with the invention, the process acts illustrated in FIG. 3 occur during a first clock cycle, and the process acts illustrated in FIG. 4 occur during the following clock cycle. The correction act of block 134 occurs late in the subsequent clock cycle, providing the necessary time for evaluating the instruction bytes of the second portion of the instruction packet and passing the end byte markings to the next pipeline stage.

Figure 5:
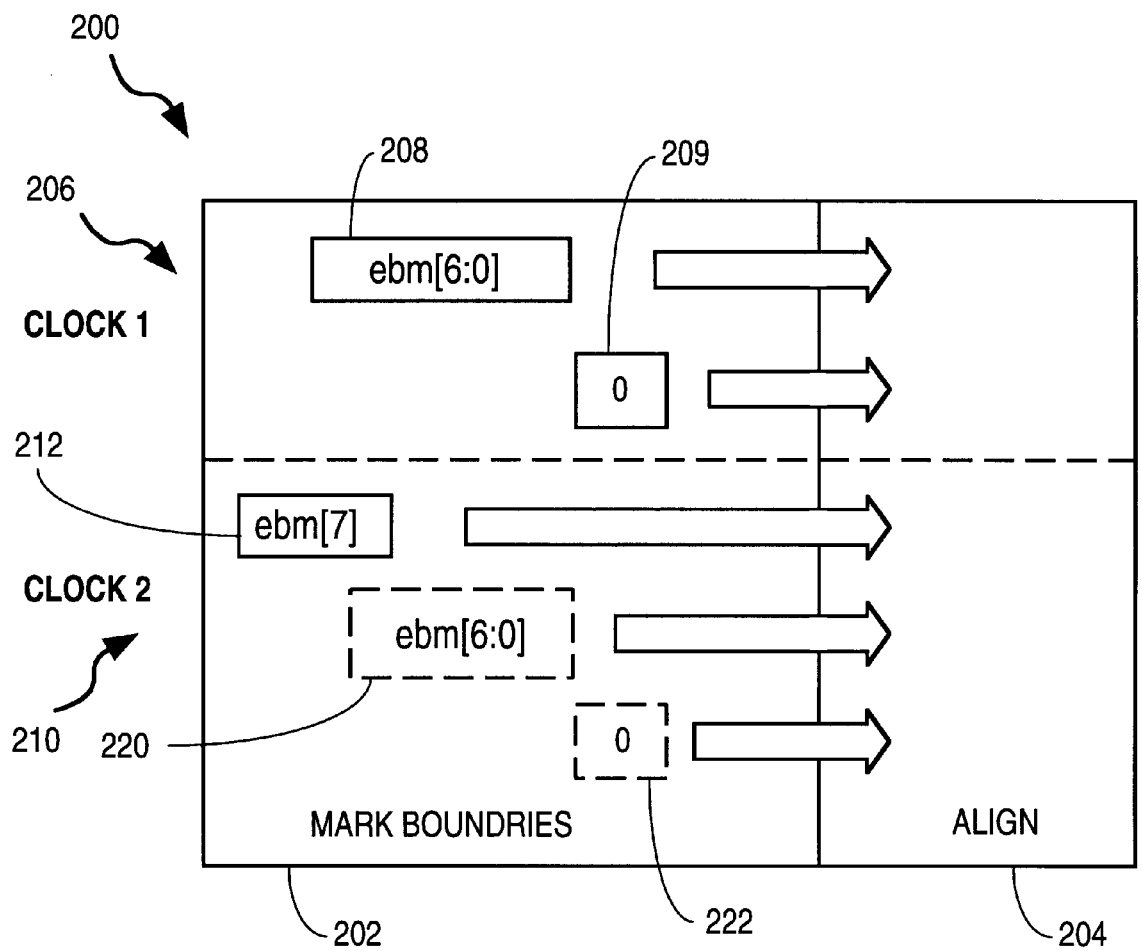
FIG. 5 is a block diagram illustrating a device in accordance with an embodiment of the present invention.

The following example further illustrates the embodiments illustrated in FIG. 3 and FIG. 4. FIG. 5 illustrates two processing pipeline stages for a device 200 in accordance with an embodiment of the invention. In FIG. 5, an instruction boundary marking stage 202 of an instruction length decoder and an align stage 204 are shown. Following a restart, a first instruction packet enters the boundary marking stage 202.

In the particular embodiment, n=8 and x=1. Therefore, the first portion of the instruction packet includes bytes 0–6 (bytes 0 through n−x−1). During a first clock cycle 206, each of these bytes are examined in block 102 of FIG. 3, and marked as an end byte or a non-end byte in block 106 and block 108, respectively. The instruction bytes may be marked with an end byte marker that is set to a logic 0, for example, if the instruction byte is a non-end byte, and a logic 1 to mark an end byte.

The second portion of the instruction packet in this particular embodiment includes byte 7 (n−1). The end byte markings for the instruction bytes in the second portion are predetermined, or predicted. For example, all instruction bytes in the second portion may be marked as non-end bytes; hence, the end byte bit would always be set to a logic 0 for byte 7 in block 112 of FIG. 3. In other words, instruction byte 7 is predicted as being a non-end byte. In the first clock cycle 206, seven end byte markers for bytes 0–6 (ebm[6:0] denoted by reference 208 in FIG. 5) are passed to the align stage 204, along with the predicted 0 (reference 209) for byte 7.

During a second clock cycle 210, the instruction byte of the second portion, byte 7, is examined (block 122 of FIG. 4). Based on this examination, the ebm for byte 7 (ebm[7], reference 212 in FIG. 5) is set to a logic 1 for an end byte or to a logic 0 for a non-end byte (block 128 of FIG. 4), and the ebm[7] 212 is passed on to the align stage 204. If, based on the examination in block 122 of FIG. 4, the ebm[7] 212 is set to a logic 0 to denote a non-end byte, the predicted 0 (reference 209) was correct. If, however, byte 7 is actually an end byte, the ebm[7] 212 is set to a logic 1, and the predicted 0 (reference 209) is corrected to the proper marking as an end byte in the align stage 204 (see block 134 of FIG. 4).

Any necessary corrections to the predicted end byte marking 209 are made late in the second clock cycle 210, providing additional time for evaluating the instruction bytes of the second portion and sending the ebm[7] 212 to the align stage 204. Thus, end bytes for the entire first instruction packet (bytes 0–7) are properly marked during the first and second clock cycles 206, 210.

FIG. 5 further illustrates the end byte marking process beginning for a second instruction packet following the reset during the second clock cycle 210. The first seven bytes of the second instruction packet are evaluated and the ebm[6:0] 220 for the second instruction packet are passed to the align stage 204 during the second clock cycle 210, along with a predicted logic 0 (reference 222) for instruction byte 7. The ebm[7] for the second instruction packet is evaluated and set during a subsequent clock cycle. Thus, during the first clock cycle following the reset, seven end byte markers (ebm[6:0] 208) are provided to the align stage 204. During all subsequent clock cycles (such as the second clock cycle 210) following the reset, the ebm[7] 212 for one instruction, and ebm[6:0] 220 for the next instruction, are sent to the align stage 204. In other words, seven end byte markers are sent during the first clock cycle following the reset, and eight end byte markers are sent during all subsequent clock cycles.

Figure 6:
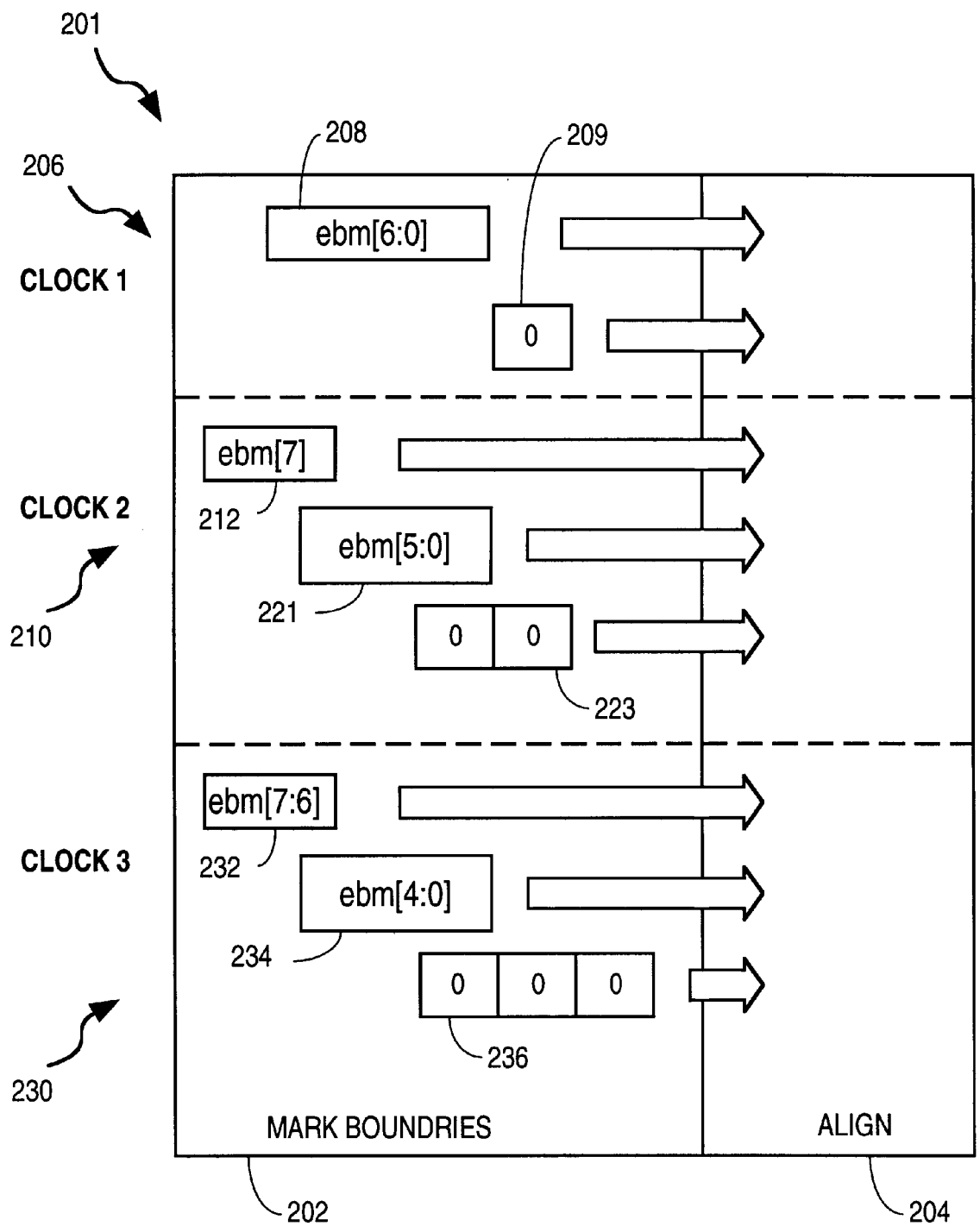
FIG. 6 is a block diagram illustrating a device in accordance with another embodiment of the present invention.

In the embodiment described above, n−x end byte markers (for instruction bytes 0 through 6) are marked and passed on the to align stage 204 during the first clock cycle 206 following a reset. During subsequent clock cycles 210, end bytes markers for n bytes are marked and passed on to the align state 204, though the n end byte markers comprise bytes from two different instruction packets. FIG. 6 illustrates a device 201 in accordance with an alternate embodiment of the invention wherein end byte markers for a given number bytes are evaluated and passed to the next stage during each clock cycle following a reset, without reducing the size of the instruction packet. In the embodiment illustrated in FIG. 6, n refers to the total number of bytes in the instruction packet, and y refers to the given number of bytes to be evaluated and marked as end bytes or non-end bytes and passed on to the following stage.

In the example above, the instruction packet comprises eight instruction bytes 0 through 7 (n=8). Assume that end byte markers for seven bytes can be set and passed on to the next stage; thus, y=7. As with the embodiment illustrated in FIG. 5, ebm[6:0] 208 is for the seven bytes (y) of the first portion of the instruction packet are marked in the boundary marking stage 202 and passed on to the align stage 204 during the first clock cycle 206. The end byte marker for byte 7 is predicted as a non-end byte (logic 0) and the predicted 0 (reference 209) is passed on to the align stage 204. The values of 8 and 7 for n and y, respectively, are exemplary only; n and y may comprise any positive integers, with n greater than y. Moreover, the end bytes of the second portion may be predicted as end bytes (logic 1).

In the second clock cycle 210, instruction byte 7 is examined and in response thereto, ebm[7] 212 is set to a logic 1 for an end byte or a logic 0 for a non-end byte, and passed to the align stage 204, where the predicted 0 (reference 209) is corrected as necessary. In the embodiment illustrated in FIG. 6, y bytes are evaluated and passed to the following stage 204 during each clock cycle. Therefore, only the first six bytes of the next instruction packet are examined and ebm[5:0] 221 are set in response to the examination in addition to ebm[7] of the previous instruction packet. Further, two logic 0s 223 (non-end byte predictors) are sent to the align stage 204 during the second clock cycle 210.

FIG. 6 further illustrates a third clock cycle 230. During the third clock cycle 230, ebm[7:6] 232 for the two predicted logic 0s 223 are set and passed on to the align stage 204, where the predicted logic 0s 223 are corrected as necessary. Since y bytes are examined and marked as end bytes or non-end bytes during each clock cycle, the first five bytes of the next instruction packet are examined and ebm[4:0] 234 are set to mark the is instruction byte as an end byte or non-end byte in addition to ebm[7:6] 232 of the previous instruction packet.

This pattern repeats until end byte markers are predicted for seven (y) bytes. A clock cycle is then required wherein the instruction bytes corresponding to each of the seven predicted end byte markers are evaluated and appropriately marked. These actual values are then passed to the align stage 204, where the necessary corrections are made to the predicted end byte markers. Alternately, a clock cycle may be inserted prior to predicting end byte markers for y bytes to evaluate and correct the predicted end byte markers. A study of the specific system's performance may be conducted to determine the optimum clock cycle in which to evaluate and correct the end byte predictions. A determination such as this would be a routine undertaking for one skilled in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for identifying boundaries between variable length instructions in a packet of instruction bytes, the method comprising the acts of:
    examining each instruction byte in a first portion of the packet;
    marking each instruction byte in the first portion as one of an end byte and a non-end byte in response to the examining act;
    predicting whether each instruction byte in a second portion of the packet is to be a predetermined one of an end byte and a non-end byte;
    marking each instruction byte in the second portion of the packet based on the predicting step; and
    correcting the predetermined end byte and non-end byte marking in the second portion of the packet if the predicting step predicted an incorrect end byte or non-end byte for each instruction byte in the second portion of the packet.

2. The method of claim 1 further comprising the act of sending the end byte markings for the instruction packet to a subsequent processing stage.

3. The method of claim 1 wherein the first portion comprises seven instruction bytes, and wherein:
    the examining act comprises examining the seven instruction bytes; and
    the first marking act comprises marking the seven instruction bytes as one of an end byte and a non-end byte in response to the examining act.

4. The method of claim 1 wherein the second portion comprises one instruction byte, and wherein the second marking act comprises marking the one instruction byte as a predetermined one of an end byte and a non-end byte.

5. The method of claim 1 wherein the second marking act comprises marking each instruction byte in the second portion as a non-end byte.

6. The method of claim 1 further comprising the acts of:
    examining each instruction byte in the second portion; and
    marking each instruction byte in the second portion as one of an end byte and a non-end byte in response to the second examining act.

7. The method of claim 6 further comprising the act of sending the end byte markings for the second portion to a subsequent processing stage.

8. The method of claim 6 further comprising the act of changing the marking as a predetermined one of an end byte and a non-end byte from the second marking act to a fourth marking act in response to the second examining act.

9. The method of claim 8 wherein the first examining act and the first and second marking acts occur during a first clock cycle.

10. The method of claim 9 wherein the second examining act and the fourth marking acts occur during a subsequent clock cycle.

11. The method of claim 6 wherein the marking acts comprise setting an end byte marker to one of a first value representing an end byte and a second value representing a non-end byte.

12. A device for identifying boundaries between variable length instructions in a packet of instruction bytes, the device comprising:
    a first stage adapted to receive the packet of instruction bytes and examine the instruction bytes in a first portion of the packet;
    at least one end byte marker provided by the first stage in response to examining the instruction bytes in the first portion, each end byte marker corresponding to an instruction byte and having one of a first level that represents an end byte and a second level that represents a non-end byte;
    at least one end byte predictor provided by the first stage, each end byte predictor corresponding to an instruction byte in a second portion of the packet and being set to a preselected one of the first level and the second level; and
    a second stage coupled to the first stage to receive the end byte markers and the end byte predictors.

13. The device of claim 12 wherein the first portion includes seven instruction bytes and wherein the at least one end byte marker comprises seven end byte markers.

14. The device of claim 13 wherein the second portion includes one instruction byte and wherein the at least one end byte predictor comprises one end byte predictor.

15. The device of claim 12 wherein the at least one end byte predictor is set to the second level.

16. The device of claim 12 wherein the first stage provides the at least one end byte marker and the at least one end byte predictor to the second stage during a first clock cycle.

17. The device of claim 16 wherein the first stage is further adapted to examine each of the instruction bytes in the second portion and in response thereto, provide at least one corresponding end byte marker set to one of the first level and the second level during a second clock cycle.

18. The device of claim 17 wherein the second stage is adapted to change the level of the at least one end byte predictor in response to the at least one end byte marker corresponding to the instruction bytes in the second portion.

19. The device of claim 18 wherein the second stage changes the level of the at least one end byte predictor during the second clock cycle.

20. A method of providing instruction end byte markers that identify boundaries between variable length instructions in a packet of instruction bytes from a first processing stage to a second processing stage, the method comprising the acts of:

provided end byte markers for a first portion of a first packet and at least one end byte predictor for a second portion of the first packet to the second processing stage during a first clock cycle after a reset; and providing end byte markers for the second portion of the first packet, end byte markers for a first portion of a second packet, and at least one end byte predictor for a second portion of the second packet to the second processing stage during subsequent clock cycles.

21. The method of claim 20 further comprising the act of changing the end byte predictor for the second portion of the first packet in response to the end byte marker for the second portion of the first packet during the subsequent clock cycle.

22. The method of claim 20 wherein each instruction packet comprises N bytes, and each second portion comprises X bytes, where N and X are positive integers, and wherein:

N−X end byte markers are provided during the first clock cycle following the reset;

N end byte markers are provided during subsequent clock cycles following the reset; and the N end byte markers provided during the subsequent clock cycles comprise end byte markers corresponding to instruction bytes from different instruction packets.

23. The method of claim 20 wherein each instruction packet comprises N bytes, and Y end byte markers are provided during the first clock cycle after a reset and during subsequent clock cycles, where N and Y are positive integers with N greater than Y.

24. A method of providing instruction end byte markers that identify boundaries between variable length instructions in a packet of instruction bytes from a first processing stage to a second processing stage, the packet including N bytes where N is a positive integer, the method comprising the acts of:

providing Y end byte markers and at least one end byte predictor to the second processing stage during clock cycles following a reset, where Y is a positive integer less than N; and providing Y end byte markers and no end byte predictors to the second processing stage during a clock cycle following a clock cycle wherein Y end byte predictors are provided to the second processing stage.

* * * * *

UNITED STATES PATENT AND TRADEMARK OFFICE
CERTIFICATE OF CORRECTION

PATENT NO. : 6,032,250
DATED : February 29, 2000
INVENTOR(S) : Zaidi

It is certified that error appears in the above-identified patent and that said Letters Patent is hereby corrected as shown below:

In column 7, at line 6, after "mark the" delete --is--.

Signed and Sealed this

Fifteenth Day of May, 2001

Attest:

NICHOLAS P. GODICI

Attesting Officer     Acting Director of the United States Patent and Trademark Office